US012617394B2

(12) United States Patent
　Matsuoka

(10) Patent No.: US 12,617,394 B2
(45) Date of Patent: May 5, 2026

(54) INFORMATION PROCESSING APPARATUS, VEHICLE, AND NON-TRANSITORY STORAGE MEDIUM

(71) Applicant: TOYOTA JIDOSHA KABUSHIKI KAISHA, Toyota (JP)

(72) Inventor: Katsuhiro Matsuoka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 205 days.

(21) Appl. No.: 18/544,729

(22) Filed: Dec. 19, 2023

(65) Prior Publication Data

US 2024/0217511 A1　Jul. 4, 2024

(30) Foreign Application Priority Data

Dec. 28, 2022　(JP) ................................. 2022-211462

(51) Int. Cl.
　B60W 30/09　(2012.01)
　B60W 50/14　(2020.01)
　G08G 1/16　(2006.01)
　H04W 4/46　(2018.01)
(52) U.S. Cl.
　CPC ............ B60W 30/09 (2013.01); B60W 50/14 (2013.01); G08G 1/161 (2013.01); G08G 1/164 (2013.01); H04W 4/46 (2018.02); B60W 2556/45 (2020.02)
(58) Field of Classification Search
　CPC .. B60W 30/09; B60W 50/14; B60W 2556/45; H04W 4/46; G08G 1/161; G08G 1/164
　See application file for complete search history.

(56) References Cited

U.S. PATENT DOCUMENTS

| | | | | |
|---|---|---|---|---|
| 2020/0178269 A1* | 6/2020 | Haas | ....................... | H04W 4/40 |
| 2020/0257308 A1* | 8/2020 | Herman | .............. | G05D 1/0231 |
| 2022/0028271 A1* | 1/2022 | Koravadi | .............. | B60W 50/14 |
| 2022/0108602 A1* | 4/2022 | Kathuria | .............. | G08G 1/0112 |
| 2023/0282112 A1* | 9/2023 | James | .................... | G08G 1/056 |
| | | | | 340/436 |
| 2024/0157959 A1* | 5/2024 | Jung | ..................... | B60W 50/14 |
| 2025/0091609 A1* | 3/2025 | Mahadevan | .......... | B60W 50/14 |
| 2025/0196852 A1* | 6/2025 | Perez Barrera | ........ | G08G 1/166 |
| 2025/0225874 A1* | 7/2025 | Yang | ................... | G08G 1/0112 |

FOREIGN PATENT DOCUMENTS

JP　　　　2018-101376 A　　6/2018

* cited by examiner

*Primary Examiner* — Peter D Nolan
*Assistant Examiner* — Wae L Louie
(74) *Attorney, Agent, or Firm* — Dinsmore & Shohl LLP

(57)　　　　　ABSTRACT

An information processing apparatus mounted on a vehicle includes a controller configured to be capable of performing driving assist control and notification control. In a case where the vehicle receives another-vehicle information including information about a travel state of another vehicle from another vehicle by vehicle-to-vehicle communication, the controller performs the driving assist control based on the another-vehicle information. Furthermore, in a case where the vehicle receives the another-vehicle information not by vehicle-to-vehicle communication but from a server apparatus that performs communication with another vehicle, the controller performs the notification control based on the another-vehicle information without performing the driving assist control based on the another-vehicle information.

16 Claims, 7 Drawing Sheets

ANOTHER-VEHICLE INFORMATION

| VEHICLE ID | POSITION INFORMATION | VELOCITY INFORMATION |
|------------|----------------------|----------------------|
| V001 | ... | ... |

Fig. 3

INFORMATION PROCESSING APPARATUS, VEHICLE, AND NON-TRANSITORY STORAGE MEDIUM

CROSS REFERENCE TO THE RELATED APPLICATION

This application claims the benefit of Japanese Patent Application No. 2022-211462, filed on Dec. 28, 2022, which is hereby incorporated by reference herein in its entirety.

BACKGROUND

Technical Field

The present disclosure relates to control of a vehicle that is capable of receiving another-vehicle information by wireless communication.

Description of the Related Art

Patent Literature 1 discloses a driving assist apparatus that uses vehicle-to-vehicle communication. The driving assist apparatus disclosed in Patent Literature 1 receives, by vehicle-to-vehicle communication, travel state information including position information of another vehicle traveling in the proximity of a subject vehicle. The driving assist apparatus estimates a road shape around the own vehicle based on a track of the position information of another vehicle. Furthermore, the driving assist apparatus sets a monitoring region around the own vehicle based on the estimated road shape. Moreover, the driving assist apparatus assists traveling of the own vehicle based on the travel state information of another vehicle located in the monitoring region.

CITATION LIST

Patent Literature

Patent Literature 1: Japanese Patent Application Laid-Open Publication No. 2018-101376

SUMMARY

An object of the present disclosure is to more suitably control a vehicle that is capable of receiving another-vehicle information including information about a travel state of another vehicle by wireless communication.

An information processing apparatus according to a first aspect of the present disclosure is an information processing apparatus mounted on a vehicle, the information processing apparatus including a controller configured to be capable of performing driving assist control and notification control, in which the controller may perform, in a case where the vehicle receives another-vehicle information including information about a travel state of another vehicle from another vehicle by vehicle-to-vehicle communication, the driving assist control based on the another-vehicle information, and may perform, in a case where the vehicle receives the another-vehicle information not by vehicle-to-vehicle communication but from a server apparatus that performs communication with another vehicle, the notification control based on the another-vehicle information without performing the driving assist control based on the another-vehicle information.

A vehicle according to a second aspect of the present disclosure is a vehicle that is capable of performing driving assist control and notification control, in which the vehicle may be configured to:

perform, in a case where another-vehicle information including information about a travel state of another vehicle is received from another vehicle by vehicle-to-vehicle communication, the driving assist control based on the another-vehicle information; and perform, in a case where the another-vehicle information is received not by vehicle-to-vehicle communication but from a server apparatus that performs communication with another vehicle, the notification control based on the another-vehicle information without performing the driving assist control based on the another-vehicle information.

A non-transitory storage medium according to a third aspect of the present disclosure is a non-transitory storage medium storing a program for causing an information processing apparatus mounted on a vehicle to perform driving assist control or notification control, in which the program may cause, in a case where the vehicle receives another-vehicle information including information about a travel state of another vehicle from another vehicle by vehicle-to-vehicle communication, the information processing apparatus to perform the driving assist control based on the another-vehicle information, and may cause, in a case where the vehicle receives the another-vehicle information not by vehicle-to-vehicle communication but from a server apparatus that performs communication with another vehicle, the information processing apparatus to perform the notification control based on the another-vehicle information without causing the information processing apparatus to perform the driving assist control based on the another-vehicle information.

According to the present disclosure, a vehicle that is capable of receiving another-vehicle information by wireless communication may be more suitably controlled.

BRIEF DESCRIPTION OF THE DRAWINGS

FIG. 3 is a diagram illustrating an example of a table structure of another-vehicle information;

DESCRIPTION OF THE EMBODIMENTS

Figure 1:
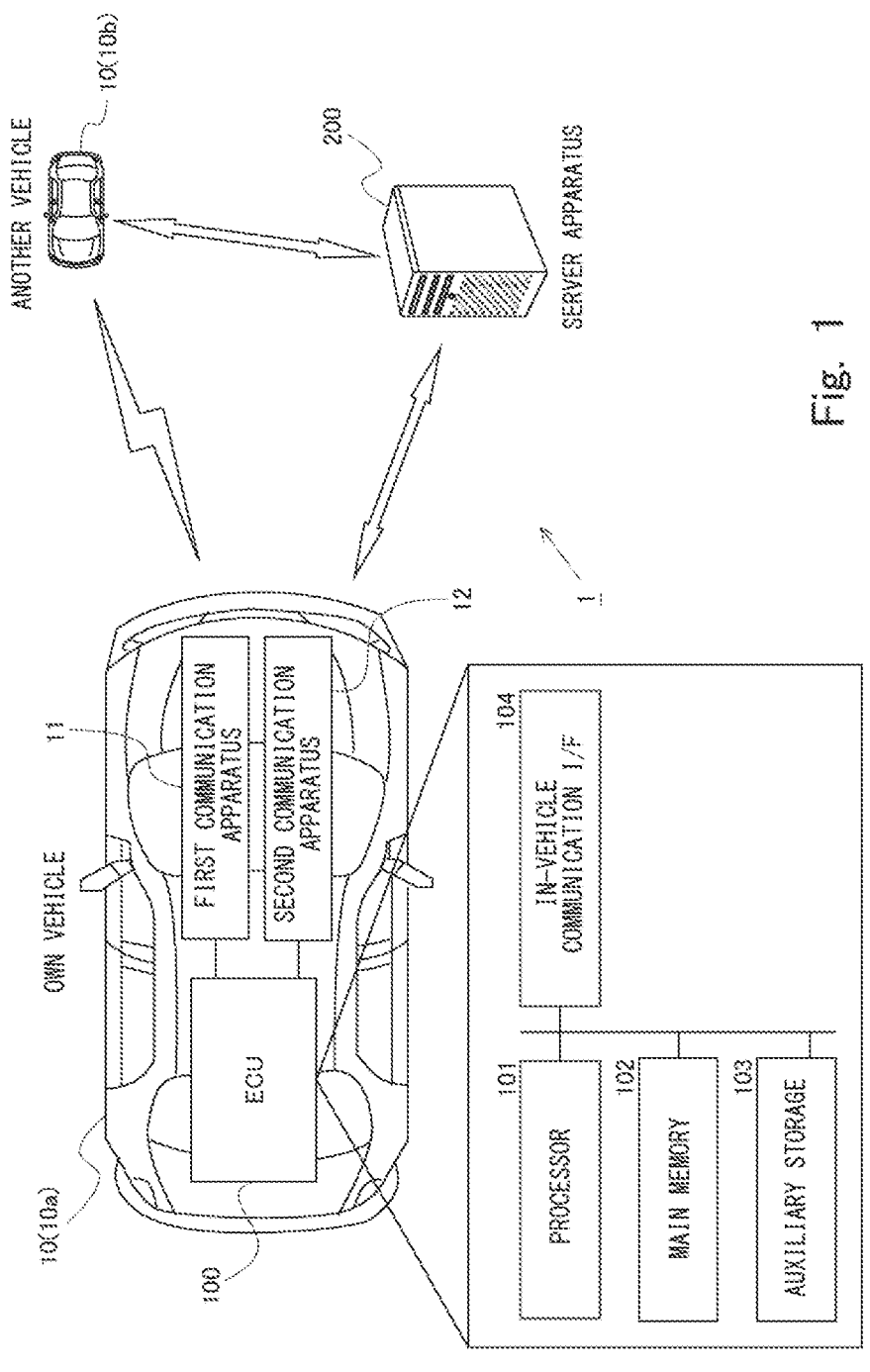
FIG. 1 is a diagram illustrating schematic configurations of a communication system and a vehicle according to an embodiment.

An information processing apparatus according to the present disclosure is an apparatus mounted on a vehicle.

Furthermore, the information processing apparatus according to the present disclosure may include a controller configured to be capable of performing driving assist control and notification control. The driving assist control here is travel control for an own vehicle that is automatically performed to prevent the own vehicle from colliding into another vehicle. The driving assist control may be stop control of causing the own vehicle to stop automatically or deceleration control of causing the own vehicle to decelerate automatically, for example. Moreover, the notification control is control of notifying a driver of the own vehicle of presence of another vehicle. The notification control may be control of notifying the driver of the own vehicle of presence of another vehicle by audio or an image.

A vehicle on which the information processing apparatus is mounted includes a function of performing wireless communication with another vehicle and a server apparatus. The server apparatus also performs communication with another vehicle. Moreover, the vehicle on which the information processing apparatus is mounted is capable of receiving another-vehicle information including information about a travel state of another vehicle, from another vehicle by vehicle-to-vehicle communication. Moreover, the vehicle on which the information processing apparatus is mounted is capable of receiving the another-vehicle information from the server apparatus that received the another-vehicle information from another vehicle.

However, the vehicle where the information processing apparatus is mounted is not necessarily capable of receiving the another-vehicle information by both vehicle-to-vehicle communication and communication with the server apparatus at all times. That is, depending on a positional relationship between the own vehicle and another vehicle, there may arise a state where the another-vehicle information can be received by only one of vehicle-to-vehicle communication and communication with the server apparatus. Particularly, with vehicle-to-vehicle communication, it is assumed that temporary interruption is more easily caused than with the communication with the server apparatus due to presence, between the own vehicle and another vehicle, of an object that may become a communication obstacle.

However, with vehicle-to-vehicle communication, the own vehicle directly receives the another-vehicle information from another vehicle, and thus, a time lag is less likely to be caused than in the case where the own vehicle receives the another-vehicle information through the server apparatus. Accordingly, the another-vehicle information that is received by vehicle-to-vehicle communication is assumed to be more reliable than the another-vehicle information that is received by the communication with the server apparatus.

Accordingly, in the case where the own vehicle receives the another-vehicle information from another vehicle by vehicle-to-vehicle communication, the controller may perform the driving assist control based on the another-vehicle information. That is, the controller may automatically control traveling of the own vehicle based on the another-vehicle information so as to prevent collision with another vehicle. On the other hand, in the case where the own vehicle receives the another-vehicle information not by vehicle-to-vehicle communication but from the server apparatus, the controller may perform the notification control based on the another-vehicle information without performing the driving assist control based on the another-vehicle information. That is, instead of automatically controlling traveling of the own vehicle, the controller may issue a notification to the driver of the own vehicle based on the another-vehicle information to call attention to another vehicle.

Accordingly, with the information processing apparatus according to the present disclosure, when the another-vehicle information is received by vehicle-to-vehicle communication where reliability of received information is higher than in the case of communication through the server apparatus, traveling of the own vehicle is automatically controlled. Accordingly, the driving assist control may be performed based on information that is relatively more reliable. Furthermore, when the another-vehicle information is received only by communication with the server apparatus where the reliability of received information is lower than in the case of vehicle-to-vehicle communication, traveling of the own vehicle is not automatically controlled, and a notification is simply issued to the driver of the own vehicle. Accordingly, execution of the driving assist control based on information that is relatively less reliable may be prevented, and attention of the driver of the own vehicle may be drawn to another vehicle.

Hereinafter, specific embodiments of the present disclosure will be described with reference to the drawings. Dimensions, materials, shapes, relative positions and the like of structural components described in the present embodiments are not intended to limit the technical scope of the present disclosure unless stated otherwise.

First Embodiment (Outline of System)

Schematic configurations of a communication system and a vehicle according to a present embodiment will be described with reference to FIG. 1. FIG. 1 is a diagram illustrating schematic configurations of the communication system and the vehicle according to the present embodiment. In a communication system 1, wireless communication is performed between each of a plurality of vehicles 10 and a server apparatus 200. Each vehicle 10a, 10b regularly transmits vehicle information including information about a travel state of itself to the server apparatus 200. Furthermore, in the communication system 1, vehicle-to-vehicle communication is performed between an own vehicle 10a and another vehicle 10b when the vehicles are present within a predetermined communicable range.

The vehicle-to-vehicle communication between the own vehicle 10a and another vehicle 10b and wireless communication between each vehicle 10a, 10b and the server apparatus 200 use different communication methods. For example, vehicle-to-vehicle communication between the own vehicle 10a and another vehicle 10b may be performed by Dedicated Short Range Communications (DSCR) or Cellular V2X (C-V2X). By contrast, wireless communication between each vehicle 10a, 10b and the server apparatus 200 may be performed by cellular communication.

The own vehicle 10a includes an electric central unit (ECU) 100, a first communication apparatus 11, and a second communication apparatus 12. The first communication apparatus 11 is a communication apparatus that is used to perform vehicle-to-vehicle communication with another vehicle 10b. The second communication apparatus 12 is a communication apparatus that is used to perform communication with the server apparatus 200.

The ECU 100 is a computer that is mounted on the own vehicle 10a. The ECU 100 includes a processor 101, a main memory 102, an auxiliary storage 103, and an in-vehicle communication interface (in-vehicle communication I/F) 104.

The processor 101 is a central processing unit (CPU) or a digital signal processor (DSP), for example. The main memory 102 is a random access memory (RAM), for example. The auxiliary storage 103 is a read only memory (ROM), a hard disk drive (HDD), or a flash memory, for example. The auxiliary storage 103 may also include a removable medium (removable recording medium). The removable medium here is a USB memory, an SD card, or a disk recording medium such as CD-ROM, a DVD disc, or a Blu-ray disc, for example.

The in-vehicle communication I/F 104 is an interface for performing communication with another apparatus provided in the own vehicle 10*a*, by using a predetermined in-vehicle communication standard. The predetermined in-vehicle communication standard may be a controller area network (CAN) or a local interconnect network (LIN), for example. The ECU 100 performs communication with the first communication apparatus 11 and the second communication apparatus 12 via the in-vehicle communication I/F 104. The ECU 100 is capable of acquiring, via the in-vehicle communication I/F 104, information that is received by the first communication apparatus 11 from another vehicle 10*b* and information that is received by the second communication apparatus 12 from the server apparatus 200.

The auxiliary storage 103 stores an operating system (OS), various programs, various information tables, and the like. When the processor 101 loads, into the main memory 102, and executes the programs stored in the auxiliary storage 103, driving assist control and notification control described later are performed. Note that the ECU 100 does not necessarily have to be implemented by a single physical structure, and may instead be configured by a plurality of computers that operate in conjunction with each other. Furthermore, at least one or all of functions of the ECU 100 may be implemented by a hardware circuit such as an ASIC or an FPGA.

The own vehicle 10*a* is a vehicle that is capable of performing the driving assist control and the notification control. The driving assist control is travel control for the own vehicle 10*a* that is automatically performed to prevent the own vehicle 10*a* from colliding into another vehicle 10*b*. The notification control is control of notifying a driver of the own vehicle 10*a* of presence of another vehicle 10*b*.

Figure 2:
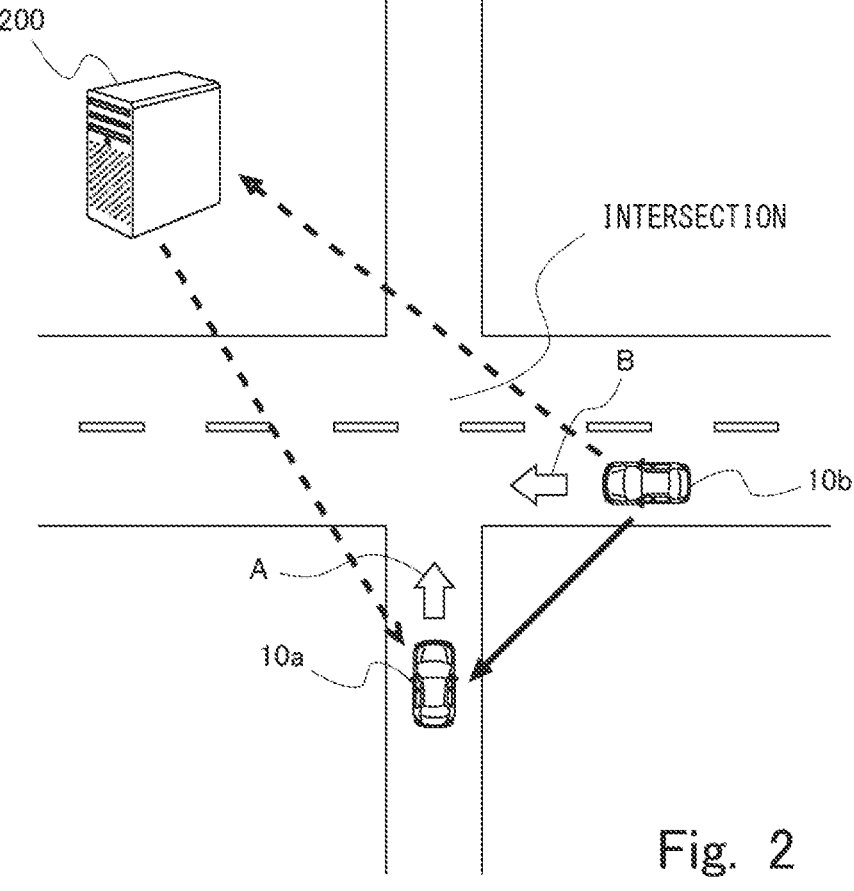
FIG. 2 is a diagram illustrating an example of a traffic state including an own vehicle and another vehicle.

A traffic state in which the driving assist control or the notification control is performed by the own vehicle 10*a* will be described with reference to FIG. 2. FIG. 2 is a diagram illustrating a traffic state including the own vehicle 10*a* and another vehicle 10*b*. In FIG. 2, a white arrow A indicates a traveling direction of the own vehicle 10*a*, and a white arrow B indicates a traveling direction of another vehicle 10*b*. Furthermore, in FIG. 2, a solid arrow and dashed arrows indicate transmission/reception of another-vehicle information.

In FIG. 2, the own vehicle 10*a* is about to enter an intersection. Furthermore, another vehicle 10*b* is traveling toward the intersection that the own vehicle 10*a* is about to enter. At this time, the own vehicle 10*a* and another vehicle 10*b* are assumed to be in a predetermined communicable range of each other.

In the communication system 1, when the own vehicle 10*a* and another vehicle 10*b* are in the state as illustrated in FIG. 2, the own vehicle 10*a* receives another-vehicle information that is vehicle information about another vehicle 10*b*. FIG. 3 is a diagram illustrating an example of a table structure of the another-vehicle information. As illustrated in FIG. 3, another-vehicle information table includes a vehicle ID field, a position information field, and a velocity information field. A vehicle ID that is identification information for identifying another vehicle 10*b* is input in the vehicle ID field. Information indicating a current position of another vehicle 10*b* is input in the position information field. Information indicating a velocity of another vehicle 10*b* is input in the velocity information field. Additionally, information indicating a travel state of another vehicle 10*b*, other than the position information and the velocity information, may also be included in the another-vehicle information.

As indicated by the solid arrow in FIG. 2, the own vehicle 10*a* receives the another-vehicle information from another vehicle 10*b* by vehicle-to-vehicle communication. Furthermore, as indicated by the dashed arrows in FIG. 2, the own vehicle 10*a* also receives the another-vehicle information by communication through the server apparatus 200. More specifically, as described above, another vehicle 10*b* transmits the vehicle information also to the server apparatus 200. In the case where the own vehicle 10*a* and another vehicle 10*b* are present in a predetermined communicable range, the server apparatus 200 transmits the vehicle information that is received from another vehicle 10*b* to the own vehicle 10*a*. That is, the own vehicle 10*a* receives the vehicle information that is transmitted to the server apparatus 200 by another vehicle 10*b*, from the server apparatus 200 as the another-vehicle information. Then, at the own vehicle 10*a*, the ECU 100 performs the driving assist control or the notification control based on the another-vehicle information.

However, the own vehicle 10*a* is not necessarily able to receive the another-vehicle information by both vehicle-to-vehicle communication and the communication with the server apparatus 200 at all times. For example, vehicle-to-vehicle communication between the own vehicle 10*a* and another vehicle 10*b* may be temporarily interrupted due to presence of an object that may be a communication obstacle, such as a building, near the intersection. Therefore, vehicle-to-vehicle communication between the own vehicle 10*a* and another vehicle 10*b* is more easily interrupted than the communication between the own vehicle 10*a* or another vehicle 10*b* and the server apparatus 200.

However, with vehicle-to-vehicle communication, the own vehicle 10*a* receives the another-vehicle information directly from another vehicle 10*b*, and thus, a time lag is less likely to occur than in a case where the own vehicle 10*a* receives the another-vehicle information of another vehicle 10*b* via the server apparatus 200. Accordingly, the another-vehicle information that is received by vehicle-to-vehicle communication is more reliable than the another-vehicle information that is received by the communication with the server apparatus 200.

Accordingly, the ECU 100 selects and performs one of the driving assist control and the notification control depending on whether the own vehicle 10*a* receives the another-vehicle information by vehicle-to-vehicle communication with another vehicle 10*b* or not. More specifically, in the case where the own vehicle 10*a* receives the another-vehicle information 10*a* from another vehicle 10*b* by vehicle-to-vehicle communication, the ECU 100 performs the driving assist control based on the another-vehicle information. In the case where the own vehicle 10*a* receives the another-vehicle information not by vehicle-to-vehicle communication but from the server apparatus 200, the ECU 100 performs the notification control based on the another-vehicle information instead of performing the driving assist control based on the another-vehicle information. In the present embodiment, the ECU 100 corresponds to "information processing apparatus" according to the present disclosure.

(Functional Configuration)

Figure 4:
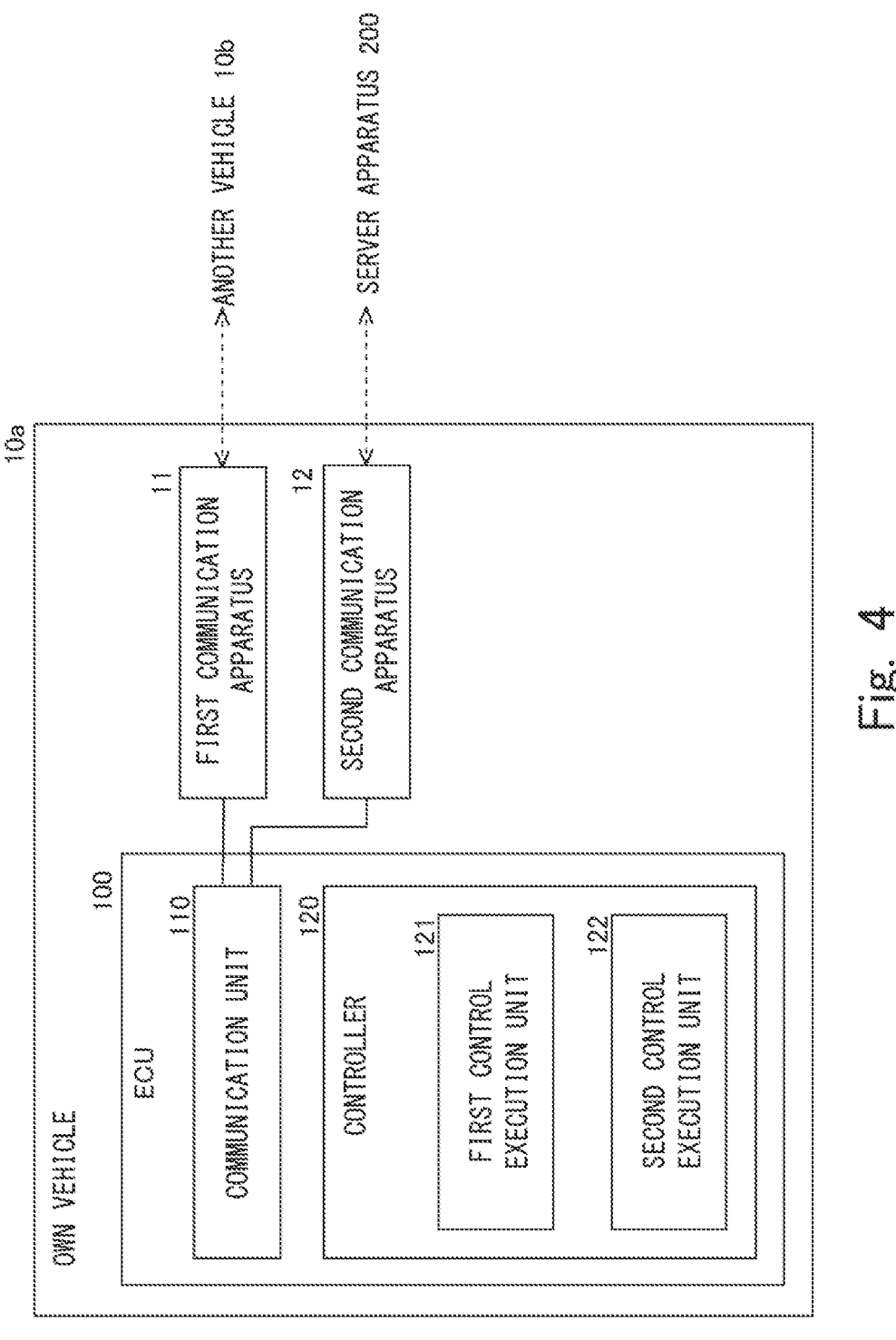
FIG. 4 is a block diagram schematically illustrating an example of a functional configuration of an ECU.

A functional configuration of the ECU 100 mounted on the own vehicle 10*a* according to the present embodiment will be described with reference to FIG. 4. FIG. 4 is a block diagram schematically illustrating an example of the functional configuration of the ECU 100.

As illustrated in FIG. 4, the ECU 100 includes a communication unit 110 and a controller 120 as functional units. As described above, the own vehicle 10*a* includes the first communication apparatus 11 that performs vehicle-to-vehicle communication with another vehicle 10*b*, and the second communication apparatus 12 that performs communication with the server apparatus 200. The communication unit 110 of the ECU 100 includes a function of performing in-vehicle communication with the first communication apparatus 11 and the second communication apparatus 12. The communication unit 110 may be implemented by the in-vehicle communication I/F 104.

The controller 120 includes a first control execution unit 121 and a second control execution unit 122. The first control execution unit 121 includes a function of performing the driving assist control. The first control execution unit 121 performs the driving assist control by transmitting a command to a travel control apparatus of the own vehicle 10*a*, such as a brake or an accelerator, via the in-vehicle communication I/F 104. For example, the driving assist control is stop control of causing the own vehicle 10*a* to stop or deceleration control of causing the own vehicle 10*a* to decelerate.

The second control execution unit 122 includes a function of performing the notification control. The second control execution unit 122 performs the notification control by transmitting a command to a notification apparatus mounted on the own vehicle 10*a*, such as a monitor or a speaker, via the in-vehicle communication I/F 104. The notification control is control of notifying a driver of the own vehicle 10*a* of presence of another vehicle 10*b* by audio or an image.

When the another-vehicle information is received by at least one of the first communication apparatus 11 and the second communication apparatus 12, the ECU 100 acquires the received another-vehicle information via the communication unit 110. At this time, the ECU 100 also acquires vehicle information about the own vehicle 10*a*. Note that the vehicle information about the own vehicle 10*a* may be acquired using various sensors provided in the own vehicle 10*a*.

Then, the controller 120 determines whether there is a possibility of collision between the own vehicle 10*a* and another vehicle 10*b*, based on the another-vehicle information and the vehicle information of the own vehicle 10*a*. For example, in the case of the traffic state illustrated in FIG. 2, the ECU 100 may possibly determine that there is a possibility of the own vehicle 10*a* colliding into another vehicle 10*b* in the intersection.

In the case where it is determined by the controller 120 that there is a possibility of the own vehicle 10*a* colliding into another vehicle 10*b*, the first control execution unit 121 or the second control execution unit 122 performs the driving assist control or the notification control. At this time, in the case where the another-vehicle information is received by the first communication apparatus 11, the driving assist control is performed by the first control execution unit 121. By contrast, in the case where the another-vehicle information is not received by the first communication apparatus 11, and the another-vehicle information is received only by the second communication apparatus 12, the notification control is performed by the second control execution unit 122.

(Information Processing)

Figure 5:
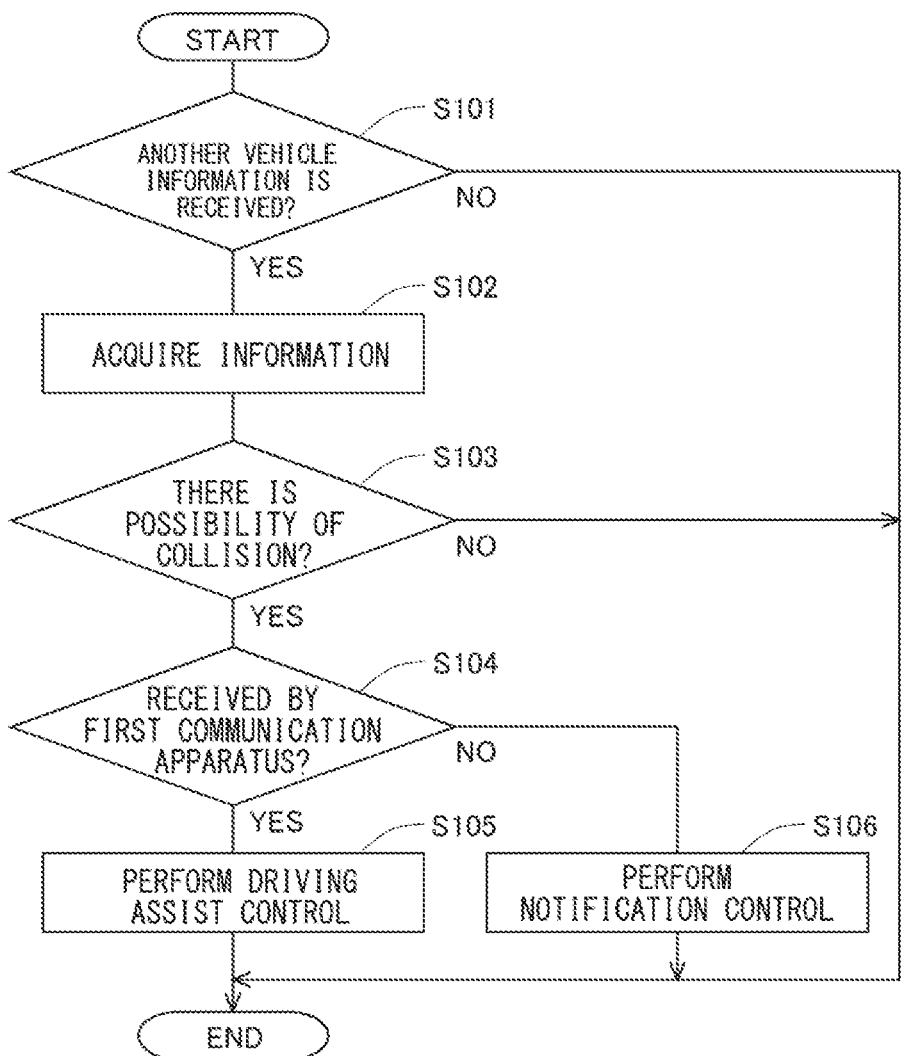
FIG. 5 is a flowchart illustrating a flow of first information processing that is performed by the ECU of the own vehicle.

Next, information processing according to the present embodiment that is performed by the ECU 100 based on the another-vehicle information will be described with reference to FIG. 5. FIG. 5 is a flowchart illustrating a flow of information processing that is performed by the ECU 100 of the own vehicle 10*a*. The present flow is performed by the controller 120 of the ECU 100.

In the present flow, first, in S101, whether the another-vehicle information is received by at least one of the first communication apparatus 11 and the second communication apparatus 12 or not is determined. In the case where negative determination is made in S101, or in other words, in the case where no another-vehicle information is received by the first communication apparatus 11 and the second communication apparatus 12, execution of the present flow is temporarily ended.

In the case where positive determination is made in S101, the process in S102 is performed next. In S102, the received another-vehicle information and the vehicle information of the own vehicle 10*a* are acquired. Additionally, as illustrated in FIG. 3, the vehicle information includes the vehicle ID of the vehicle 10 that has transmitted the vehicle information. Accordingly, in the case where the another-vehicle information is received by both the first communication apparatus 11 and the second communication apparatus 12, the ECU 100 may identify that the pieces of information are information about the same another vehicle 10*b*, by referring to the vehicle IDs included in the pieces of another-vehicle information received.

Next, in S103, whether or not there is a possibility of the own vehicle 10*a* colliding into another vehicle 10*b* is determined based on the another-vehicle information and the own vehicle information acquired in S102. In the case where negative determination is made in S103, neither the driving assist control nor the notification control has to be performed. Accordingly, in this case, execution of the present flow is temporarily ended.

By contrast, in the case where positive determination is made in S103, the process in S104 is performed next. In S104, whether the another-vehicle information is received by the first communication apparatus 11 or not is determined. In the case where positive determination is made in S104, the process in S105 is performed next. Here, positive determination is made in S104 in both the case where the another-vehicle information is received by both the first communication apparatus 11 and the second communication apparatus 12, and the case where the another-vehicle information is received only by the first communication apparatus 11.

In S105, the driving assist control is performed by the first control execution unit 121 to prevent the own vehicle 10*a* from colliding into another vehicle 10*b*. Then, execution of the present flow is temporarily ended.

By contrast, in the case where negative determination is made in S104, or in other words, in the case where the another-vehicle information is received only by the second communication apparatus 12 and not by the first communication apparatus 11, the process in S106 is performed next. In S106, the notification control is performed by the second control execution unit 122 to draw attention of the driver of the own vehicle 10*a* to another vehicle 10*b*. Then, execution of the present flow is temporarily ended.

According to the information processing as described above, the driving assist control is performed when the own vehicle 10a receives the another-vehicle information by vehicle-to-vehicle communication where reliability of received information is higher than in the case of communication through the server apparatus 200. Accordingly, the driving assist control can be performed at the own vehicle 10a based on information with relatively high reliability. Furthermore, in the case where the own vehicle 10a receives the another-vehicle information only by communication with the server apparatus 200 where reliability of received information is lower than in the case of vehicle-to-vehicle communication, traveling of the own vehicle 10a is not automatically controlled, and a notification is simply issued to the driver of the own vehicle 10a. Accordingly, execution of the driving assist control based on information with relatively low reliability may be prevented, and also, attention of the driver of the own vehicle 10a may be drawn to another vehicle 10b.

Modification

In the following, a description will be given of a modification of the present embodiment. In the communication system 1, in the case where the own vehicle 10a and another vehicle 10b are present in a predetermined communicable range of each other, if there is no communication obstacle, the another-vehicle information about another vehicle 10b is regularly received by the subject vehicle 10a by both vehicle-to-vehicle communication and communication through the server apparatus 200. Then, when a certain communication obstacle is generated between the own vehicle 10a and another vehicle 10b, reception of the another-vehicle information by the own vehicle 10a by vehicle-to-vehicle communication is interrupted. Here, a timing of interruption of reception of the another-vehicle information by the own vehicle 10a by vehicle-to-vehicle communication may sometimes be referred to below as "interruption timing".

Here, there is the case where the another-vehicle information received by vehicle-to-vehicle communication and the another-vehicle information received by communication through the server apparatus 200 are the same in a predetermined period of time before the interruption timing. That is, there is the case where the current positions, the velocities, and the like of another vehicle 10b included in the pieces of another-vehicle information received by both types of communication are the same. In this case, it is assumed that there is a low possibility of occurrence of a time lag in the communication through the server apparatus 200. Accordingly, also after the interruption timing, the another-vehicle information that is received by the communication through the server apparatus 200 can be evaluated to have a same level of reliability as in the case where the another-vehicle information is received by vehicle-to-vehicle communication. Accordingly, in the present modification, in the case where the another-vehicle information is received by the own vehicle 10a not by vehicle-to-vehicle communication but only by communication through the server apparatus 200, the ECU 100 performs a process of evaluating the reliability of the another-vehicle information that is received.

Figure 6:
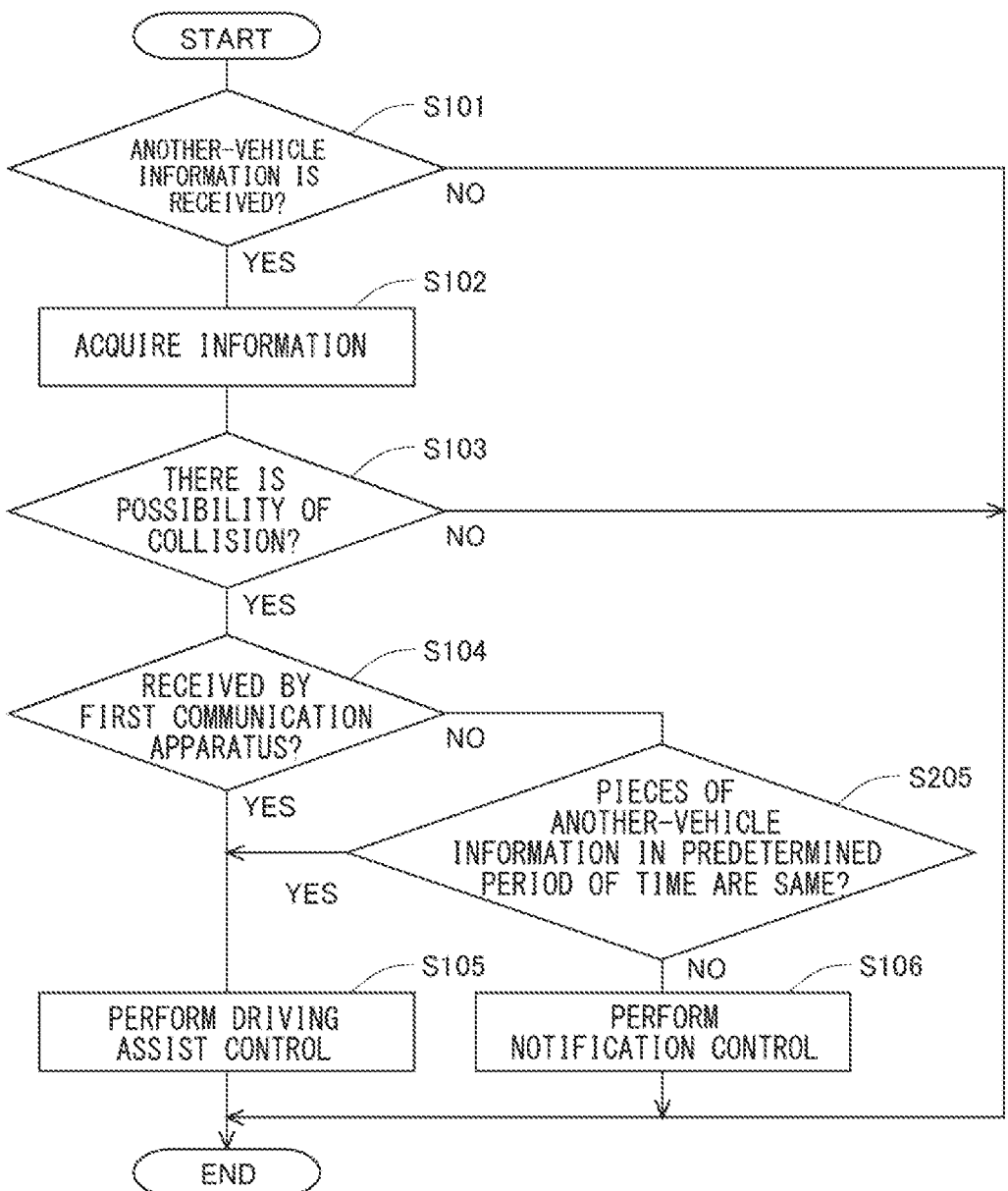
FIG. 6 is a flowchart illustrating a flow of second information processing that is performed by the ECU of the own vehicle.

A description of information processing according to the present modification that is performed by the ECU 100 based on the another-vehicle information will be given with reference to FIG. 6. FIG. 6 is a flowchart illustrating a flow of information processing that is performed by the ECU 100 of the own vehicle 10a. In the present flow, processes performed in steps other than S205 are the same as the processes performed in the steps with the same reference numbers in the flowchart illustrated in FIG. 5. Accordingly, description of the processes performed in the steps other than S205 will be omitted. The present flow is also performed by the controller 120 of the ECU 100.

In the present flow, in the case where negative determination is made in S104, the process in S205 is performed next. In the case where negative determination is made in S104, reception of the another-vehicle information by the own vehicle 10a by vehicle-to-vehicle communication is interrupted. At this time, in S205, whether pieces of the another-vehicle information received by the first communication apparatus 11 and the second communication apparatus 12 in a first predetermined period of time before the interruption timing are the same or not is determined. That is, whether the pieces of another-vehicle information received by vehicle-to-vehicle communication and by communication through the server apparatus 200 in the first predetermined period of time before the interruption timing are the same or not is determined. Here, whether pieces of another-vehicle information are the same or not is determined by comparing the pieces of another-vehicle information with the same vehicle ID received by the communication apparatuses 11, 12 in the first predetermined period of time before the interruption timing.

In the case where negative determination is made in S205, there is a possibility of occurrence of a time lag in the communication through the server apparatus 200. In this case, it is assumed that the another-vehicle information that is received only by communication through the server apparatus 200 has a relatively low reliability. Accordingly, in the case where negative determination is made in S205, the notification control is performed next in S106. By contrast, in the case where positive determination is made in S205, there is a low possibility of occurrence of a time lag in the communication through the server apparatus 200 at a current time point. In this case, the driving assist control is performed next in S105.

In the present modification, in the case where reception of the another-vehicle information by the own vehicle 10a by vehicle-to-vehicle communication is interrupted, whether the another-vehicle information received by communication through the server apparatus 200 has the same level of reliability as in the case where the another-vehicle information is received by vehicle-to-vehicle communication is determined. Then, in the case where the another-vehicle information received by communication through the server apparatus 200 has the same level of reliability as in the case where the another-vehicle information is received by vehicle-to-vehicle communication, the driving assist control is performed at the own vehicle 10a based on the another-vehicle information. Accordingly, even in a case where reception of the another-vehicle information by the own vehicle 10a by vehicle-to-vehicle communication is interrupted, the driving assist control can be performed based on the another-vehicle information.

Second Embodiment

Schematic configurations of the communication system and the vehicle according to a present embodiment are the same as those in the first embodiment. In the present embodiment, in the case where the own vehicle 10a receives the another-vehicle information by vehicle-to-vehicle communication, the ECU 100 determines, based on predetermined conditions, which of the stop control and the deceleration control is to be performed as the driving assist control.

There is the case where the own vehicle 10a receives the another-vehicle information by both vehicle-to-vehicle communication and communication through the server apparatus 200, and the pieces of another-vehicle information received by both types of communication are the same. In this case, the reliability of the another-vehicle information is higher than in a case where the another-vehicle information is not received by the own vehicle 10a by communication through the server apparatus 200 and the another-vehicle information is received only by vehicle-to-vehicle communication.

Accordingly, in the case where the own vehicle 10a receives the another-vehicle information by both vehicle-to-vehicle communication and the communication through the server apparatus 200, and the pieces of another-vehicle information received by the two types of communication are the same, the ECU 100 performs the stop control as the driving assist control. By contrast, in the case where the own vehicle 10a receives another-vehicle information by only vehicle-to-vehicle communication, the ECU 100 performs the deceleration control as the driving assist control. Moreover, in the case where the own vehicle 10a receives the another-vehicle information by both vehicle-to-vehicle communication and the communication through the server apparatus 200, but the pieces of another-vehicle information received by the two types of communication are different from each other, the ECU 100 performs the deceleration control as the driving assist control.

(Information Processing)

Figure 7:
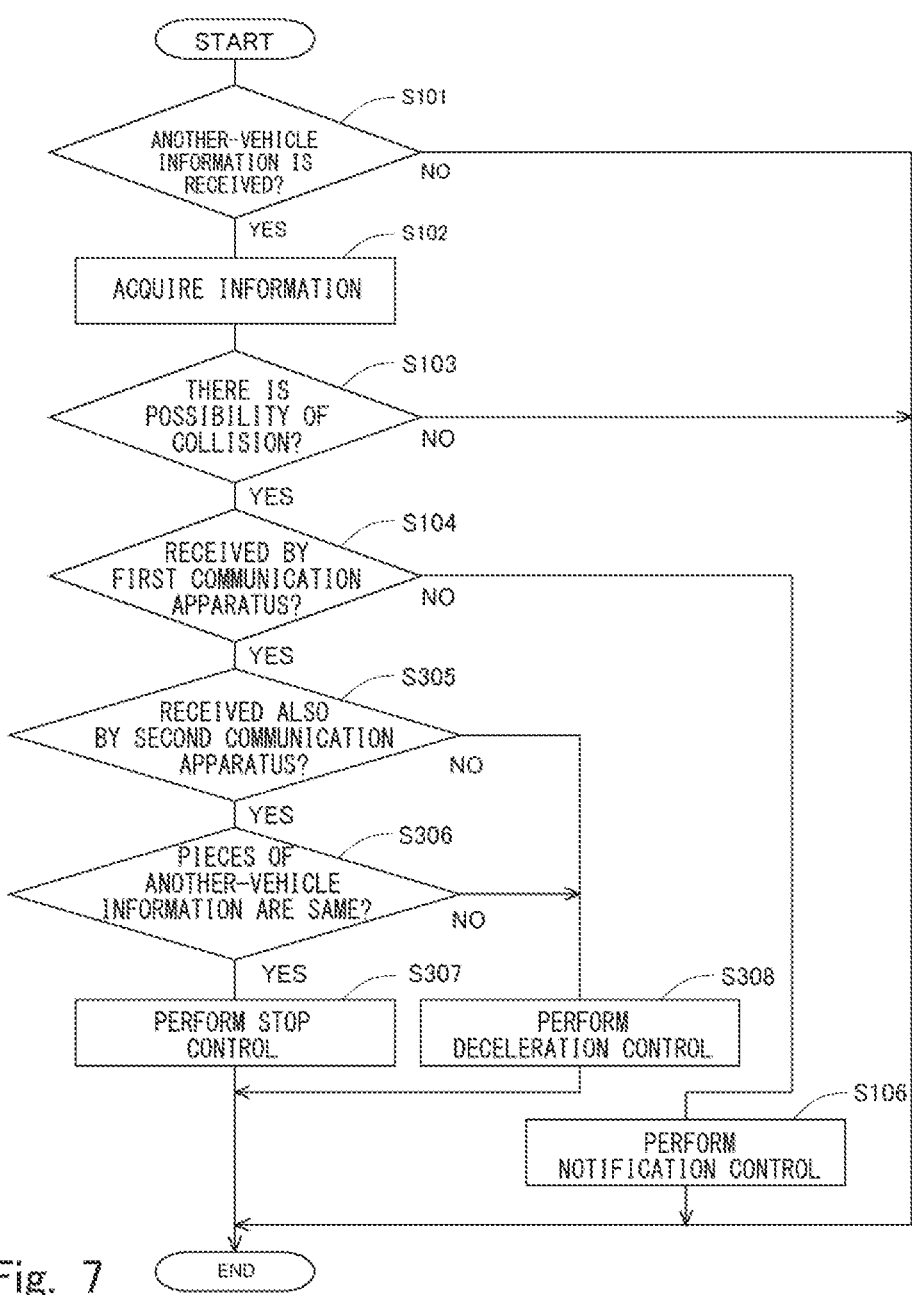
FIG. 7 is a flowchart illustrating a flow of third information processing that is performed by the ECU of the own vehicle.

Information processing according to the present embodiment that is performed by the ECU 100 based on the another-vehicle information will be described with reference to FIG. 7. FIG. 7 is a flowchart illustrating a flow of information processing that is performed by the ECU 100 of the own vehicle 10a. In the present flow, S305 to S308 are performed instead of S105 in the flowchart illustrated in FIG. 5. In the present flow, processes performed in steps other than S305 to S308 are the same as the processes performed in the steps with the same reference numbers in the flowchart illustrated in FIG. 5. Accordingly, description of the processes performed in the steps other than S305 to S308 will be omitted. The present flow is also performed by the controller 120 of the ECU 100.

In the present flow, in the case where positive determination is made in S104, the process in S305 is performed next. In S305, whether the another-vehicle information is received by the second communication apparatus 12 or not is determined. In the case where positive determination is made in S305, the process in S306 is next performed. In S306, whether the another-vehicle information received by the first communication apparatus 11 and the another-vehicle information received by the second communication apparatus 12 are the same or not is determined.

In the case where positive determination is made in S306, the process in S307 is performed next. In S307, the stop control is performed by the first control execution unit 121 to prevent the own vehicle 10a from colliding into another vehicle 10b. Then, execution of the present flow is temporarily ended.

By contrast, in the case where negative determination is made in S305, or in the case where negative determination is made in S306, the process in S308 is performed next. In S308, the deceleration control is performed by the second control execution unit 122 to prevent the own vehicle 10a from colliding into another vehicle 10b. Then, execution of the present flow is temporarily ended.

According to the present embodiment, in the case where the own vehicle 10a receives the another-vehicle information by vehicle-to-vehicle communication, the driving assist control according to the level of reliability of the another-vehicle information received can be performed at the own vehicle 10a.

Note that the driving assist control that is performed at the own vehicle 10a is not limited to the stop control and the deceleration control. Moreover, also in the case where the driving assist control other than the stop control and the deceleration control can be performed at the own vehicle 10a, the ECU 100 may, as described above, determine specifics of the driving assist control to be performed, according to the level of reliability of the another-vehicle information that is received.

OTHER EMBODIMENTS

The embodiments described above are merely examples, and the present disclosure may be changed and implemented as appropriate within the scope of the disclosure. Furthermore, processes and components described in the present disclosure may be freely combined to the extent that no technical conflict exists.

Furthermore, a process that is described to be performed by one apparatus may be shared and performed by a plurality of apparatuses. Processes described to be performed by different apparatuses may be performed by one apparatus. Which function is to be implemented by which hardware configuration (server configuration) in a computer system may be flexibly changed.

The present disclosure may also be implemented by supplying computer programs for implementing the functions described in the embodiments described above to a computer, and by one or more processors of the computer reading out and executing the programs. Such computer programs may be provided to the computer by a non-transitory computer-readable storage medium that can be connected to a system bus of the computer, or may be provided to the computer through a network. The non-transitory computer-readable storage medium may be any type of disk including magnetic disks (floppy (registered trademark) disks, hard disk drives (HDDs), etc.) and optical disks (CD-ROMs, DVD discs, Blu-ray discs, etc.), and any type of medium suitable for storing electronic instructions, such as read-only memories (ROMs), random access memories (RAMs), EPROMS, EEPROMs, magnetic cards, flash memories, or optical cards.

What is claimed is:

1. An information processing apparatus mounted on a vehicle, the information processing apparatus comprising a controller configured to be capable of performing driving assist control and notification control, wherein the controller performs, in a case where the vehicle receives another-vehicle information including information about a travel state of another vehicle from the another vehicle by vehicle-to-vehicle communication, the driving assist control based on the another-vehicle information, the driving assist control is a travel control for the vehicle that is automatically performed to prevent the vehicle from colliding into the another-vehicle, and performs, in a case where the vehicle receives the another-vehicle information not by vehicle-to-vehicle communication but from a server apparatus that performs communication with the another vehicle, the notification control based on the another-vehicle information without performing the driving assist control based on the another-vehicle information.

2. The information processing apparatus according to claim 1, wherein, in a case where the vehicle receives the another-vehicle information not by vehicle-to-vehicle communication but from the server apparatus, when the another-vehicle information received from the another vehicle by vehicle-to-vehicle communication and the another-vehicle information received by communication with the server apparatus are same in a predetermined period of time before a time point when reception of the another-vehicle information from the another vehicle by vehicle-to-vehicle communication is disabled, the controller performs the driving assist control based on the another-vehicle information received from the server apparatus.

3. The information processing apparatus according to claim 1, wherein, when the vehicle receives the another-vehicle information by both vehicle-to-vehicle communication and communication with the server apparatus, and pieces of the another-vehicle information received by respective types of communication are same, the controller performs, based on the another-vehicle information, the driving assist control that is different from when the another-vehicle information is received only by vehicle-to-vehicle communication.

4. The information processing apparatus according to claim 1, wherein the another-vehicle information includes identification information for identifying the another vehicle.

5. The information processing apparatus according to claim 1, wherein the another-vehicle information includes, as the information about the travel state of the another vehicle, at least position information of the another vehicle and a velocity of the another vehicle.

6. The information processing apparatus according to claim 1, wherein the driving assist control is stop control of causing an own vehicle to stop automatically or deceleration control of causing the own vehicle to decelerate automatically.

7. The information processing apparatus according to claim 1, wherein the notification control is control of notifying a driver of an own vehicle of presence of the another vehicle by audio or an image.

8. A vehicle that is capable of performing driving assist control and notification control, the vehicle being configured to:

perform, in a case where another-vehicle information including information about a travel state of another vehicle is received from the another vehicle by vehicle-to-vehicle communication, the driving assist control based on the another-vehicle information, the driving assist control is a travel control for the vehicle that is automatically performed to prevent the vehicle from colliding into the another-vehicle; and perform, in a case where the another-vehicle information is received not by vehicle-to-vehicle communication but from a server apparatus that performs communication with the another vehicle, the notification control based on the another-vehicle information without performing the driving assist control based on the another-vehicle information.

9. The vehicle according to claim 8, wherein, in a case where the another-vehicle information is received not by vehicle-to-vehicle communication but from the server apparatus, when the another-vehicle information received from the another vehicle by vehicle-to-vehicle communication and the another-vehicle information received by communication with the server apparatus are same in a predetermined period of time before a time point when reception of the another-vehicle information from the another vehicle by vehicle-to-vehicle communication is disabled, the driving assist control is performed based on the another-vehicle information received from the server apparatus.

10. The vehicle according to claim 8, wherein, when the another-vehicle information is received by both vehicle-to-vehicle communication and communication with the server apparatus, and pieces of the another-vehicle information received by respective types of communication are same, the driving assist control that is different from when the another-vehicle information is received only by vehicle-to-vehicle communication is performed based on the another-vehicle information.

11. The vehicle according to claim 8, wherein the another-vehicle information includes identification information for identifying the another vehicle.

12. The vehicle according to claim 8, wherein the another-vehicle information includes, as the information about the travel state of the another vehicle, at least position information of the another vehicle and a velocity of the another vehicle.

13. The vehicle according to claim 8, wherein the driving assist control is stop control of causing an own vehicle to stop automatically or deceleration control of causing the own vehicle to decelerate automatically.

14. The vehicle according to claim 8, wherein the notification control is control of notifying a driver of an own vehicle of presence of the another vehicle by audio or an image.

15. A non-transitory storage medium storing a program for causing an information processing apparatus mounted on a vehicle to perform driving assist control or notification control, wherein the program causes, in a case where the vehicle receives another-vehicle information including information about a travel state of another vehicle from the another vehicle by vehicle-to-vehicle communication, the information processing apparatus to perform the driving assist control based on the another-vehicle information, the driving assist control is a travel control for the vehicle that is automatically performed to prevent the vehicle from colliding into the another-vehicle, and causes, in a case where the vehicle receives the another-vehicle information not by vehicle-to-vehicle communication but from a server apparatus that performs communication with the another vehicle, the information processing apparatus to perform the notification control based on the another-vehicle information without causing the information processing apparatus to perform the driving assist control based on the another-vehicle information.

16. The non-transitory storage medium according to claim 15, wherein, in a case where the vehicle receives the another-vehicle information not by vehicle-to-vehicle communication but from the server apparatus, when the another-vehicle information received from the another vehicle by vehicle-to-vehicle communication and the another-vehicle information received by communication with the server apparatus are same in a predetermined period of time before a time point when reception of the another-vehicle information from the another vehicle by vehicle-to-vehicle communication is disabled, the program causes the information processing apparatus to perform the driving assist control based on the another-vehicle information received from the server apparatus.

* * * * *